United States Patent [19]
O'Shea

[11] 3,939,119
[45] Feb. 17, 1976

[54] AROMATIC POLYETHER-POLYTHIOETHER-POLYSULFONE THERMOPLASTICS

[75] Inventor: Francis X. O'Shea, Naugatuck, Conn.

[73] Assignee: Uniroyal, Inc., New York, N.Y.

[22] Filed: May 27, 1971

[21] Appl. No.: 147,599

[52] U.S. Cl....... 260/49; 260/30.8 R; 260/30.8 DS; 260/33.8 R
[51] Int. Cl.² .......................................... C08G 65/40
[58] Field of Search .................. 260/47 R, 49, 79 R

[56] References Cited
UNITED STATES PATENTS

| | | |
|---|---|---|
| 2,822,351 | 2/1958 | Kreuchunas .................. 260/79.3 |
| 3,332,909 | 7/1967 | Farnham et al. .................. 260/47 |
| 3,432,468 | 3/1969 | Gabler .................. 260/47 |
| 3,594,446 | 7/1971 | Gabler et al. .................. 260/823 |

*Primary Examiner*—Lester L. Lee
*Attorney, Agent, or Firm*—Willard R. Sprowls

[57] ABSTRACT

Thermoplastic copolymers are formed by the interaction of a 4-mercaptophenol and a dihalo-substituted aromatic sulfone of the structure X+phenylene-SO$_2$2-phenylene+$_y$X, wherein $y$ is 1 or 2. The latter are typified by 4,4'-dichlorodiphenyl sulfone and 4,4'-bis(4-chlorophenylsulfonyl)biphenyl. The mercaptophenol may have one or two lower alkyl groups ortho to the hydroxyl.

The polymers are characterized by high glass transition temperatures and high impact strength.

8 Claims, No Drawings

AROMATIC POLYETHER-POLYTHIOETHER-POLYSULFONE THERMOPLASTICS

BACKGROUND OF THE INVENTION p-Benzenedithiol has been interpolymerized with 4,4'-dichlorodiphenyl sulfone. — Kreuchunas, U.S. Pat. No. 2,822,351.

4,4'-Thiodiphenol has been interpolymerized with 4,4'-dichlorodiphenyl sulfone. — Johnson and Franhem, British Pat. No. 1,078,234.

4,4'-Oxydi(benzenethiol) has been interpolymerized with 4,4'-dichlorodiphenyl sulfone and with 4,4'-bis(4-chlorophenylsulfonyl)biphenyl. — Gabler, German Offenlegungsschrift 2,009,323, published Sept. 10, 1970. The resulting polymers have respectively the structures

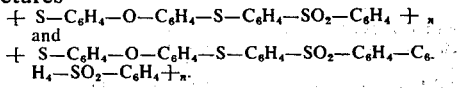

THE INVENTION

My new thermoplastic high polymers are aromatic polyether-polysulfide-polysulfones composed of recurring units of oxyphenylenethio moieties (derived from a 4-mercaptophenol) and sulfonyldiphenylene moieties (derived from sulfonyldiphenylene dihalide compounds of the formula $X + C_6H_4-SO_2-C_6H_4 +_y X$ where y is 1 or 2).

The polymers, accordingly, have the structure $+R+C_6H_4-SO_2-C_6H_4+_y+_n$ where y is 1 or 2, n is an integer from about 30 to 60, R is a mixture of —OR'—S— and —S—R'—O—, and R' is a phenylene group.

These polymers are characterized by superior resistance to high temperatures, and by toughness and stability. They are useful for the production of molded articles.

The polymers are prepared by the condensation of substantially equimolar amounts of a 4-mercaptophenol (preferably in the form of the potassium salt) and 4,4'-dichlorodiphenyl sulfone or 4,4'-bis (4-chlorophenylsulfonyl) biphenyl in a highly polar, inert, aprotic organic solvent in the absence of oxygen.

The 4,4'-bis (4-chlorophenylsulfonyl)biphenyl referred to is described and claimed in the copending application of Robert J. Cornell, Ser. No. 138,347 filed Apr. 28, 1971, and now abandoned. In that application the preparation of 4,4'-bis(4-chlorophenylsulfonyl)-biphenyl is described as follows:

To a stirred mixture of biphenyl (30.8 g.; 0.2 mole) and 4-chlorobenzenesulfonyl chloride (94.9 g.; 0.45 mole) at 70°C., ferric chloride (5 g.) was added. The temperature was raised to 140°C., the reaction mixture solidified. It was further heated for 2 hours after solidification. The solid was then dissolved in dimethylformamide (DMF) and, upon cooling, the named product crystallized out. A second recrystallization from DMF resulted in white crystals, m.p. 271°–273°C.; yield, 65% of theory.

The 4-mercaptophenol employed may have no alkyl substituents, or, if desired, may have one or two lower alkyl groups ($C_1$ to $C_4$) ortho to the hydroxyl group. Examples of such compounds are 4-mercaptophenol, and the 2-methyl and 2,6-dimethyl homologs thereof.

Exemplary solvents of the kind described are dimethyl sulfoxide, dimethyl sulfone, diethyl sulfoxide, diisopropyl sulfone, and tetrahydrothiophene 1,1-dioxide (commonly called sulfolane).

The mercaptophenol is converted, in situ in the selected solvent, to its alkali metal salt by reaction with alkali metal, alkali metal hydride, alkali metal hydroxide, alkali metal alkoxide or alkali metal alkyl, an alkali metal hydroxide being preferred.

As in other such reactions, it is essential in the polymerization reaction that the solvent be maintained substantially anhydrous before and during the reaction, since the presence of water leads to formation of only low molecular weight polymers and phenolic species.

It is often convenient to form the alkali metal salt of the mercaptophenol in situ in the reaction solvent. The mercaptophenol and an alkali metal hydroxide are admixed in essentially stoichiometric amounts and the water present is removed azeotropically with benzene, xylene, halogenated benzenes or other inert organic azeotrope-forming organic liquids. After the azeotrope has been removed, the substantially anhydrous metal salt of the mercaptophenol remains in the highly polar solvent. A preferred azeotrope-former is chlorobenzene.

The reaction between 4,4'-bis(4chlorophenylsulfonyl)biphenyl or 4,4'-dichlorodiphenyl sulfone and the metal salt of the mercaptophenol proceeds on an equimolar basis. This can be varied slightly, but a variation of ± 2% away from stoichiometry is detrimental to the molecular weight of the final polyarylene polyether-polysulfide-polysulfone. Since the desirable properties of these polymers are realized when high molecular weights are achieved, equimolar amounts of reactants are preferred.

The exclusion of oxygen from the reaction mass is necessary to avoid oxidative attack on the mercaptophenol, the polymer, or the solvent during polymerization, particularly at the higher temperatures. The use of nitrogen to blanket the reaction vessel serves this purpose very well.

The polymerization reaction readily proceeds without need of an added catalyst, upon application of heat to the mixture in the selected sulfone or sulfoxide solvent. The selected temperature should be below the boiling point of the solvent and above its freezing point. Since such solvents as dimethyl sulfone and sulfolane freeze at about room temperatures, it is obvious that, with such materials, elevated temperatures are desirable.

While the reaction temperature is not narrowly critical, it has been found that, at temperatures below about room temperature, the reaction time is extremely long in order to secure high molecular weights. Temperatures above room temperature, and generally above 100°C., are preferred. With dimethyl sulfoxide, the preferred temperature is in the range 120°–165°C., and with sulfolane, 210°–235°C. Higher temperatures for each solvent can be employed, if desired, provided care is taken to prevent degradation or decomposition of the reactants, the polymer, and the solvents employed.

The polymer can be isolated from the reaction mass by filtration of the alkali metal halide formed and stripping of the solvent. A second method involves precipitation of the polymer by a non-solvent, such as methanol. The precipitated polymer must be washed with water to remove the alkali metal halide. Proper drying involves heating to 100°–120°C. in vacuo for 8 to 12 hours.

The dried polymers are soluble in halogenated hydrocarbons, e.g., chloroform, methylene chloride, sym-tetrachloroethane, chlorobenzene, and o-dichlorobenzene. These solvents are ideal for viscosity determinations.

The following examples illustrate the preparation of polymers of my invention. All parts and percentages are by weight unless otherwise indicated.

The physical properties here reported are determined by the following testing methods:

*Reduced viscosity* is determined by dissolving a 0.45-gram sample of the polymer in the indicated solvent contained in 100-ml. volumetric flask, so that resultant solution measures exactly 100 ml. at 30°C. in a constant temperature bath. The viscosity is then determined in an Ostwald-Fenske or similar viscometer. Reduced viscosity values are obtained from the equation:

$$\text{Reduced viscosity} = \frac{t_s - t_o}{C \cdot t_o}$$

wherein $t_o$ is the efflux time of the pure solvent,
$t_s$ is the efflux time of the polymer solution,
C is the concentration of the polymer solution expressed as grams per 100 ml. of solution.

*Glass transition temperature* $T_g$, commonly also referred to as second order phase transition temperature, is determined on a Perkin-Elmer differential scanning calorimeter using a temperature rise rate of 20°C. per minute.

*Heat distortion temperature* ("HDT") is measured by A.S.T.M. procedure D-648.

*Impact strength* is determined by using a modified A.S.T.M. D-256 test. Chip impact strength values are determined on test specimens 0.5 × 0.5 × 0.100 inch, clamped in a vise set in the standard Izod tester (A.S.T.M. D-256) and struck with the hammer 0.218 inch above the vise. Because it is easier to measure and correct for minor variations in the sample width and sample thickness than to adjust the position of the sample holder, the impact value is computed as:

$$\text{Chip impact strength (inch-lbs./in.}^2) = \frac{\text{(inch-lbs. reading on tester scale)}}{\text{(Sample width)} \times \text{(Sample thickness) in inches}}$$

EXAMPLE 1

The materials used were as follows:

| Moles | Grams | Materials |
|---|---|---|
| 0.3 | 37.8 | 4-mercaptophenol |
| 0.3 | 86.1 | 4,4'-dichlorodiphenyl sulfone |
| 0.6 | 79 | 42.7% aqueous KOH solution |
|  | 450(ml.) | chlorobenzene |
|  | 200(ml.) | sulfolane |

In a one-liter stainless steel pot fitted with a mechanical stirrer, gas inlet, condenser and addition funnel were placed the sulfolane and 400 ml. of chlorobenzene. The solvent mixture was sparged with nitrogen for thirty minutes, then the 4-mercaptophenol and 50 ml. of chlorobenzene were added, and the solution was sparged with nitrogen for one hour while the temperature was raised to 90°C. The KOH solution was then added over a ten-minute period. The bath temperature was raised to 140°C. to initiate azeotropic removal of water, completed in 1½ hours. Excess chlorobenzene was removed by increasing the nitrogen flow.

The anhydrous solution of the dipotassium salt of 4-mercaptophenol thus prepared was cooled to 115°C., then the 4,4'-dichlorodiphenyl sulfone was added. The temperature of the mix was raised to 230°C. and maintained for 3 hours. The resulting viscous polymer solution was mixed with methanol to precipitate the polymer, which was then broken up while suspended in water in a high-speed Waring Blendor. The polymer was thoroughly washed with distilled water to remove all potassium chloride. Yield of polymer, after drying at 120°C. in vacuo for 12 hours, was 100%.

| Polymer properties: | |
|---|---|
| Reduced viscosity (in chloroform) | = 0.41 |
| $T_g$ | = 370°F. (188°C.) |
| HDT (at 264 psi) | = 354°F. (179°C.) |
| Chip impact strength | = 59.9 inch-lbs./inch² |

The polymer structure is:
$+R-C_6H_4-SO_2-C_6H_4+_n$,
where R is a mixture of $-O-C_6H_4-S-$ and $-S-C_6H_4-O-$.

EXAMPLE 2

Ingredients:

| Moles | Grams | Material |
|---|---|---|
| 0.12 | 60.36 | 4,4'-bis(4-chlorophenylsulfonyl)-biphenyl |
| 0.12 | 15.12 | 4-mercaptophenol |
| 0.24 | 30.95 | 43.6% KOH solution |
|  | 300(ml.) | chlorobenzene |
|  | 140(ml.) | sulfolane |

This example was conducted in the same manner as Example 1.

| Polymer properties: | |
|---|---|
| Reduced viscosity (in sym-tetrachloroethane) | = 0.54 |
| $T_g$ | = 460°F. (238°C.) |
| Chip impact strength | = 36.5 inch-lbs./inch² |

The polymer structure is:
$+R-C_6H_4-SO_2-C_6H_4-C_6H_4-SO_2-C_6H_4+_n$,
where R is a mixture of $-O-C_6H_4-S-$ and $-S-C_6H_4-O-$.

EXAMPLE 3

Ingredients:

| Moles | Grams | Material |
|---|---|---|
| 0.3 | 42 | 2-methyl-4-mercaptophenol |
| 0.3 | 86.1 | 4,4'-dichlorodiphenyl sulfone |
| 0.6 | 78.8 | 42.6% KOH solution |
|  | 310(ml.) | sulfolane |
|  | 500(ml.) | chlorobenzene |

This example was conducted in the same manner as Example 1. The reduced viscosity (in chloroform) was 0.15. The polymer structure is:

$+R-C_6H_4-SO_2-C_6H_4+_n,$ where R is a mixture of $-S-C_6H_3(CH_3)-O-$ and $-O-C_6H_3(CH_3)-S-$.

EXAMPLE 4

Ingredients:

| Moles | Grams | Material |
|---|---|---|
| 0.2 | 30.8 | 2,6-dimethyl-4-mercaptophenol |
| 0.2 | 56.7 | 4,4'-dichlorodiphenyl sulfone |
| 0.4 | 53.0 | 42.10% KOH solution |
| | 350(ml.) | chlorobenzene |
| | 140(ml.) | sulfolane |

This example was conducted in the same manner as Example 1.

The $T_g$ was 420°F. The polymer structure is:

$+R-O-C_6H_4-SO_2-C_6H_4+_n,$ where R is a mixture of $-S-C_6H_2(CH_3)_2-O-$ and $-O-C_6H_2(CH_3)_2-S-$.

The superior properties of my polymers are shown by the following data comparing the polymers of examples 1 and 2, above, with a commercial polysulfone (P-1700) made from isopropylidene-diphenol and dichlorodiphenyl sulfone.

| | P-1700 | Ex. 1 | Ex. 2 |
|---|---|---|---|
| Chip impact strength | 26.8 | 59.9 | 36.5 |
| $T_g$ | 375°F. | 370°F. | 460°F. |
| HDT at 264 psi | 345°F. | 354°F. | |

I claim:
1. Thermoplastic high polymers consisting essentially of the structure
$+R+C_6H_4-SO_2-C_6H_4+_y+_n,$
wherein y is 1 or 2, n is an integer from about 30 to 60, R is a mixture of $-O-R'-S-$ and $-S-R'-O-$, and R' is selected from the group consisting of phenylene, methylphenylene and dimethylphenylene groups.

2. Polymers according to claim 1, wherein y is 1.

3. Polymers according to claim 1, wherein y is 2.

4. Polymers according to claim 1, wherein R' is $-C_6H_4-$.

5. Polymers according to claim 1, wherein R' is $-C_6H_3(CH_3)-$.

6. Polymers according to claim 1, wherein R' is $-C_6H_2(CH_3)_2-$.

7. A moldable polyether-polysulfide-polysulfone consisting essentially of the structure $+R-(C_6H_4-SO_2-C_6H_4)_y+_n$, wherein y is 1 or 2, n is an integer from about 30 to 60, R is a mixture of $O-R'S-$ and $-S-R'-O-$, and R' is selected from the group consisting of phenylene, methylphenylene and dimethyl phenylene groups.

8. A method of preparing a polyether-polysulfide-polysulfone consisting essentially of reacting substantially equimolar amounts of an alkali metal salt of a 4-mercaptophenol of the formula HO—R'—SH wherein R' is selected from the group consisting of phenylene, methylphenylene and dimethyl phenylene groups and a dihalide compound of the formula $X+C_6H_4-SO_2-C_6H_4+_y X$ wherein y is 1 or 2 and X is chlorine and the reaction is conducted in an anhydrous solvent.

* * * * *

UNITED STATES PATENT OFFICE
CERTIFICATE OF CORRECTION

PATENT NO. : 3,939,119
DATED : Feb. 17, 1976
INVENTOR(S) : Francis X. O'Shea

It is certified that error appears in the above-identified patent and that said Letters Patent are hereby corrected as shown below:

Cover page, inventor line: add --and ROBERT J. CORNELL, Union City, Connecticut. --

Signed and Sealed this

Twenty-first Day of September 1976

[SEAL]

Attest:

RUTH C. MASON
*Attesting Officer*

C. MARSHALL DANN
*Commissioner of Patents and Trademarks*